Figures 1, 2:
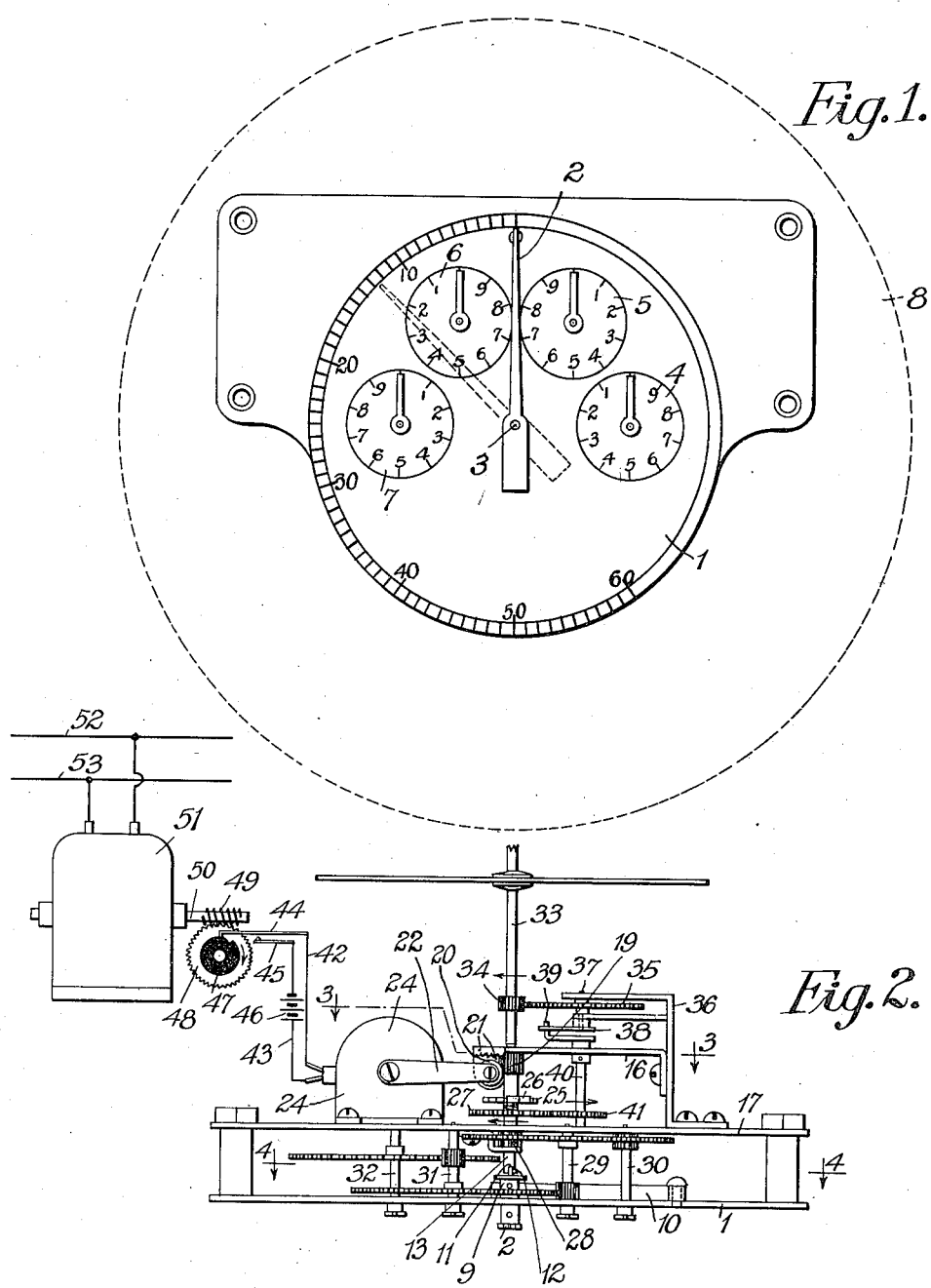

C. I. HALL.
ELECTRIC MOTOR TIME CONTROLLER.
APPLICATION FILED OCT. 10, 1911.

1,158,682.

Patented Nov. 2, 1915.
2 SHEETS—SHEET 1.

Witnesses:
Leonard W. Novander
Robert F. Bracke

Inventor
Chester I. Hall
By Brown & Williams
Attorneys

C. I. HALL.
ELECTRIC MOTOR TIME CONTROLLER.
APPLICATION FILED OCT. 10, 1911.
1,158,682.
Patented Nov. 2, 1915.
2 SHEETS—SHEET 2.
Fig. 3.
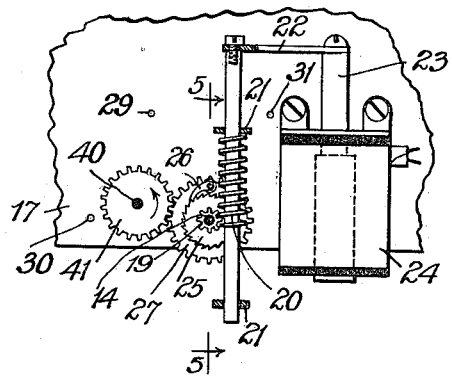
Fig. 4.
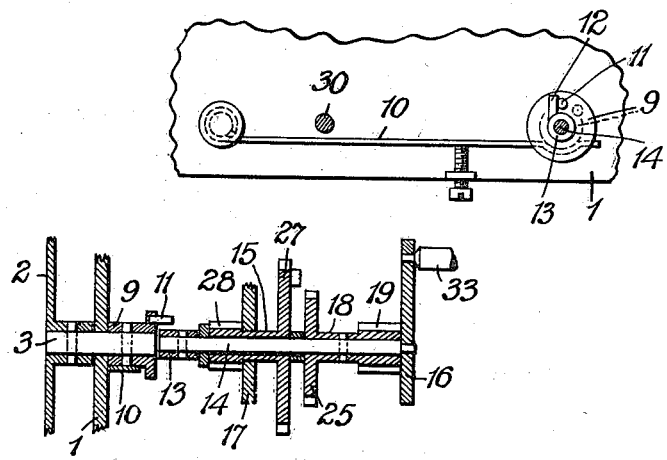
Fig. 5.
Witnesses:
Leonard W. Novander
Robert F. Brache
Inventor
Chester I. Hall
By Brown & Williams
Attorneys

UNITED STATES PATENT OFFICE.

CHESTER I. HALL, OF CHICAGO, ILLINOIS, ASSIGNOR, BY MESNE ASSIGNMENTS, TO CHICAGO ELECTRIC METER COMPANY, OF CHICAGO, ILLINOIS, A CORPORATION OF ILLINOIS.

ELECTRIC-MOTOR TIME-CONTROLLER.

1,158,682. Specification of Letters Patent. Patented Nov. 2, 1915.

Application filed October 10, 1911. Serial No. 653,862.

*To all whom it may concern:*

Be it known that I, CHESTER I. HALL, a citizen of the United States, residing at Chicago, in the county of Cook and State of Illinois, have invented certain new and useful Improvements in Electric-Motor Time-Controllers, of which the following is a full, clear, concise, and exact description, reference being had to the accompanying drawings, forming a part of this specification.

My invention relates to an improved form of time controlling mechanism for use in connection with measuring instruments by which an electric motor is employed to actuate at recurring intervals a portion of the measuring instrument previously displaced in connection with a measuring operation.

More specifically, as shown in the accompanying drawings and specification, my invention consists in the combination of an alternating current electric motor and an electric measuring instrument for indicating the maximum consumption of electric energy during any one of a number of recurring time intervals.

The motor is adapted by means of suitable mechanism and an electric circuit controlled thereby to actuate at the end of each of a number of recurring time intervals a solenoid which moves the parts of the maximum indicator to their initial position and thus establishes a proper starting relation of the parts for the next interval without, however, returning to zero the pointer indicating the maximum consumption of electricity for any previous interval. The solenoid thus energized also moves to its operating position a weight which serves to supply the necessary driving force for rotating the mechanism of the maximum indicator as such operation is permitted by the operation of the electric measuring instrument used to measure the total electricity consumed.

The several drawings illustrating my invention are as follows:

Figure 1 shows in elevation my maximum indicator complete. Fig. 2 shows a top view of the actuating mechanism of the maximum indicator and also shows diagrammatically its relation to the metering mechanism and the circuit connections employed for controlling its operation. Fig. 3 is a view of a part of the mechanism shown in Fig. 2, said view being taken along the line 3—3. Fig. 4 is a view of a part of the mechanism shown in Fig. 2, said view being taken along the line 4—4. Fig. 5 is a central longitudinal sectional view through the pointer shaft of the maximum indicator, such view being taken along the line 5—5 in Fig. 3.

Similar numerals refer to similar parts throughout the several views.

As shown in Fig. 1, the maximum indicator comprises a front plate 1 provided with a circular dial graduated to coöperate with an indicating pointer 2 supported on a shaft 3. Smaller circular dials 4, 5, 6, 7 are provided to indicate the quantity of electricity consumed while the pointer 2 serves to indicate the maximum quantity consumed for any one of a plurality of recurring time intervals. The mechanism of the measuring instrument employed for driving the pointers connected with the dials 4, 5, 6 and 7 is contained in a casing 8 located back of the maximum indicator and since this mechanism may be of any standard make and forms of itself no part of my invention, it is not shown here in detail.

As shown in Figs. 2, 3, 4, and 5, the shaft 3 carrying at its outer end the indicating pointer 2 is mounted in the front plate 1 of the maximum indicator and at its inner end has secured thereto a collar 9 against the underside of which a spring 10 rests. The collar 9 has projecting from its inner end a pin 11 adapted to be engaged by a pin 12 projecting outward from a collar 13 secured to the front end of a shaft 14, which shaft is supported in a sleeve 15 and a bracket 16 secured to the back plate 17 of the maximum indicator. The shaft 14 has secured to its rear end a sleeve 18 which carries a spur gear 19 within the bracket 16, which gear is engaged by a circular rack 20 mounted to slide in a bracket 21 supported from the bracket 16. The upper end of the rack 20 is secured preferably in a rigid manner by a bar 22 to the upper end of a plunger 23 of a solenoid 24, mounted upon the back plate 17 of the maximum indicator. The inner end of the sleeve 18 carries a ratchet wheel 25 engaged by a pawl 26 pivoted to a gear 27 carried by the rear end of the sleeve 15. The front end of the sleeve 15 has secured thereto a pinion 28 which serves to drive the gear train connecting the shafts 29, 30, 31 and 32 which carry the pointers disposed in the front of the dials 5, 4, 6 and 7 respectively. The bracket 16 also constitutes a bearing for the front end of a shaft 33 driven by the moving devices of the electric measuring instrument, whose operation is registered on the dials 4, 5, 6 and 7, this bearing being above the bearing of the rear end of the shaft 14. The shaft 33 has rigidly secured thereto a pinion 34 which meshes with a gear 35 supported by a bracket 36 from the back plate 17 of the maximum indicator. The front end of the spindle 37 supporting the gear 35 carries a radially projecting arm 38 which engages a crank arm 39 secured to the rear end of a shaft 40 rotatably supported by the bracket 16 and the back plate 17. The shaft 40 has rigidly secured thereto a gear 41 meshing with the gear 27.

As a result of the construction described it will appear that as the shaft 33 is rotated under the action of the devices employed to measure the electricity used, the pointers secured to the shafts 29, 30, 31 and 32 are rotated to register the amount registered and at the same time, as a result of the coöperation between the pins 11 and 12, the pointer 2 at the beginning of the operation of the measuring instrument is rotated around to the left as seen in Fig. 1 to a position as shown, for example, in dotted lines. It will further be noticed that, assuming the plunger 23 of the solenoid 24 to occupy the position indicated in Fig. 3, the combined weight of the plunger and rack 20 acting upon the pinion 19 will tend to rotate the gearing in a direction to produce the advance just described. The weight of the plunger 23 and the rack 20, however, is so taken that it will not of itself rotate all of the mechanism, but will serve to nearly overcome friction of all of the moving parts, thus relieving the measuring instrument of the load it would otherwise be required to carry. At the end of each of the regularly recurring intervals the solenoid 24 is energized and the plunger 23 is raised. At this time the ratchet wheel 25 slips by the pawl 26 and the plunger and rack 20 are moved to their upper position to be operative to assist in driving the gearing. At the same time the shaft 14 is positively rotated away from the pin 11 so as to return the pin 12 to its initial position without, however, disturbing the pointer 2 which is left in the position to which it has been advanced by the operation of the measuring instrument during the time interval just terminated.

The solenoid 24 has its terminals connected by wires 42 and 43 with contacts 44 and 45 respectively, a battery 46 being inserted in the wire 43. The free end of the contact 44 rests upon a cam 47 so conformed that as the cam rotates, the contact is removed from engagement with the contact 45 except when the contact 44 passes over the shoulder formed on the cam 47, at which the contact 44 springs downward into engagement with the contact 45, thus making a circuit from the battery 46 through the wires 42 and 43 and energizing the solenoid 24. The cam 47 is secured to a worm wheel 48 engaged by a worm 49 carried by the shaft 50 of a constant speed motor 51, the terminals of which are connected with main feeders 52 and 53 as indicated. The constant speed of the motor 51 may be secured in a variety of ways, the only requirement being that the speed of the motor is determined by the quantity maintained constant on the line, for example, the current may be maintained constant, in which case the motor 51 would be of a type whose speed is determined by the current flowing through its winding or again, the potential on the line 52—53 might be maintained constant, in which case the motor would be of a type adapted to run at the constant speed for a constant potential upon the line. For alternating current circuits, the motor would be preferably synchronous or an induction motor as preferred, and in either case the speed would be determined by the frequency and would therefore be constant as long as the frequency of the alternations is maintained constant. In carrying out my invention on alternating current circuits, I prefer to employ a motor of the induction type as it is self-starting and would therefore operate properly if for any reason the current were temporarily cut off from the main feeders. As a result of the construction described, the cam 47 is rotated at a constant speed and therefore the contacts 44 and 45 are periodically brought into engagement with each other, which results in a corresponding energization of the solenoid 24. The pointer 2 will therefore indicate the maximum consumption of electricity as measured by the measuring device driving the shaft 33 for any one of the intervals determined by the operation of the motor 51. It is apparent that the intervals between closures of the circuit through the battery 46 may be made of any desired length by using proper gearing between the shaft 50 and the cam 47.

While I have shown my invention in the particular embodiments herein described, I do not, however, limit myself to these constructions, but desire to claim any equivalents that may suggest themselves to those skilled in the art.

What I claim is:

1. In a system for registering the maximum consumption of electricity, the combination of a measuring instrument, a device controlled by the measuring instrument so that it operates proportionally to the electricity measured, means for returning said device to its initial position, an indicator driven by said device and remaining in a position to which it is advanced when the latter is returned to its initial position, and a constant speed motor for periodically causing the operation of the returning means, the returning means serving in part to drive said device and indicator.

2. In combination, a measuring instrument comprising an indicator, mechanism for actuating the indicator, a device for periodically restoring and subsequently aiding the actuation of the mechanism, and a constant speed motor for causing the operation of the device at recurring intervals.

3. In a measuring instrument, the combination with integrating mechanism, of an indicator for registering the amount of operation of the mechanism, devices for advancing the indicator, a weight tending to advance such devices, and means for simultaneously returning said devices to their initial position and raising said weight.

4. In a measuring instrument, the combination with integrating mechanism, of an indicator for registering the amount of operation of the mechanism, devices for advancing the indicator, and gearing for returning said devices to their initial position and tending at other times to advance said devices.

5. In a measuring instrument, the combination with integrating mechanism, of an indicator for registering the amount of operation of the mechanism, devices for advancing the indicator, a rack and pinion for returning said devices to their initial position, and a weight associated with the rack and raised when the rack is moved to return the devices to their initial position, said weight tending during operating intervals of said devices to cause their advance.

6. In a measuring instrument, the combination with integrating mechanism, of an indicator for registering the amount of operation of the mechanism, devices for advancing the indicator, a rack and pinion for returning said devices to their initial position, a solenoid plunger connected with the rack and vertically movable, and a solenoid adapted when energized to move the plunger to its upper position to return said devices to their initial position by means of the rack.

7. In a measuring instrument, the combination with integrating mechanism, of an indicator for registering the amount of operation of the mechanism, devices for advancing the indicator, a rack and pinion for returning said devices to their initial position, a solenoid plunger connected with the rack and vertically movable, and a solenoid adapted when energized to move the plunger to its upper position to return said devices to their initial position by means of the rack, the weight of the plunger tending to advance said devices by means of the rack when the solenoid is deënergized.

8. In a system for registering the maximum consumption of electricity, the combination of a measuring instrument, a device controlled by the measuring instrument so that it operates proportionally to the electricity measured, means for returning said device to its initial position, an indicator driven by said device and remaining in a position to which it is advanced when the latter is returned to its initial position, and means for periodically causing the operation of the returning means, the returning means serving in part to drive said indicator.

9. In combination, a measuring instrument comprising an indicator, mechanism for actuating the indicator, a device for periodically alternately restoring and assisting in actuating the mechanism, and means for causing the operation of the device at recurring intervals.

In witness whereof, I hereunto subscribe my name this 5th day of October, A. D., 1911.

CHESTER I. HALL.

Witnesses:
ALBERT C. BELL,
LEONARD E. BOGREE.